June 13, 1967  W. C. CRUSE  3,325,198

BUILDING STRUCTURE INCLUDING THREADLESS TIE BOLT

Original Filed June 14, 1963

INVENTOR
WILLIAM C. CRUSE

BY Shoemaker and Mattare

ATTORNEYS

United States Patent Office 3,325,198
Patented June 13, 1967

3,325,198
BUILDING STRUCTURE INCLUDING
THREADLESS TIE BOLT
William C. Cruse, Chippewa Lake, Ohio, assignor to The Akron Products Company, Seville, Ohio, a corporation of Ohio
Original application June 14, 1963, Ser. No. 288,018, now Patent No. 3,274,680, dated Sept. 27, 1966. Divided and this application June 16, 1966, Ser. No. 557,963
2 Claims. (Cl. 287—189.36)

ABSTRACT OF THE DISCLOSURE

Straight, cylindrical and threadless rods are employed in a building structure in conjunction with one-way slideable nuts thereon to secure several beams together flatwise to make a thick beam or to support them in spaced relation. The beams have aligned holes through which the respective rod passes. The rod is bent substantially at right angles at one end and contacts one of the sides of one beam. The one-way slideable nut is slid against the other side of the one beam to lock the rod and beam together. Other beams may be supported by the rod in spaced relation to the locked beam. They too are contacted on one side by a like slideable nut. The nut consists of a disc having an aperture receiving the rod and having opposed resilient tongues projecting from one side and between which the rod is clamped and the nut is locked against movement along the rod in one direction.

---

The present application is a division of application Ser. No. 288,018, filed June 14, 1963, now Patent No. 3,274,680.

This invention relates to improvements in a novel threadless anchor bolt.

In the fabrication of various types of structures such as buildings, for example, it is frequently desirable to tie together a number of units such as beams, joists, studding, rafters or the like, with such units either positioned side by side so as to make a relatively thick beam or post from a number of thinner units, or by coupling or connecting together a number of such units in spaced relation. Under such conditions the use of conventional threaded bolts may not be feasible or suitable bolts may not be available.

It is accordingly an object of the present invention to provide a new threadless bolt which may be made available "on the job" in any desired length, limited only by the length of sections or pieces of plain, unthreaded, round wire or rod material and using, with such wire or rod material, conventional spring self-gripping nuts which may be placed at any desired location on the selected length of rod material and in any number.

Another object of the invention is to provide a new and novel method of forming a head on an end of a threadless anchor bolt after a desired length of the bolt, in the form of a length of threadless round wire or rod material of steel or similar suitable metal, has been extended through apertures in two or more structural units to be tied or anchored together.

The invention will be best understood from a consideration of the following detailed description taken in connection with the accompanying drawing forming a part of the specification and wherein:

FIG. 1 illustrates the beginning of one stage in the use of the bolt of the present invention for coupling or tying together two or more structural units such as studding, rafters or the like, wherein a spring self-gripping nut has been placed on the advancing end of the bolt rod between two units, and showing in dotted outline how the first applied nut is held in place by one of the units while the rod is extended on through to receive a second nut;

Figure 5:
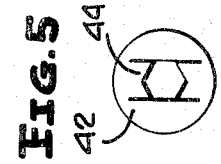
FIG. 5 is a view in elevation of the spring self-gripping nut looking at the side or face from which the flexible tongues project.
Figure 1:
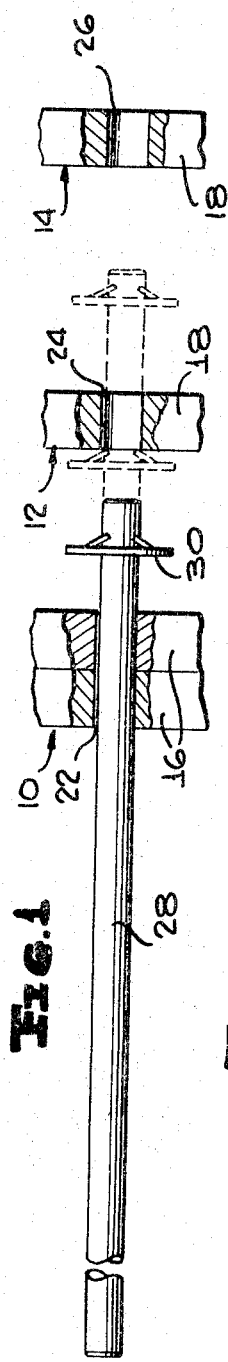

Referring now more particularly to the drawing, there are shown in each of the four figures, for purposes of illustrating the formation and method of using the threadless anchor bolt, a series or group of structural units or beams, which units are designated 10, 12 and 14. These structural units are not intended to represent any specific elements of a building or other structure. They may represent, for example, studding, floor joists, roof rafters, or other parts of a building or parts of some structure other than a building, and they may be of wood or metal. They merely represent units or elements of some type of construction, where such units are intended to be secured or tied together either in spaced relation or in abutting relation.

Considering, for example, that the three generally designated units are wood beams, it will be seen that the first unit 10 comprises two such beams, designated 16, placed together or one against the other, while the other timbers are single and each of the other single beams is designated 18 and are spaced apart one from the other and from the double beam unit 10.

Figure 4:
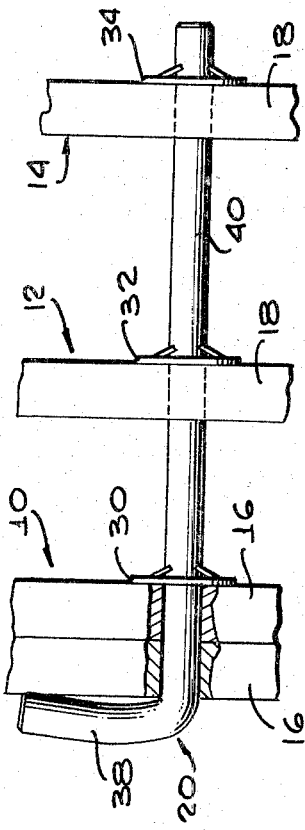
FIG. 4 is a view illustrating the final, formed bolt.

The threadless bolt of the present invention is illustrated in completed form with nuts applied thereon, in FIG. 4, showing the bolt tying or coupling together the three units 10, 12 and 14, and the bolt as a whole is designated 20.

Figure 2:
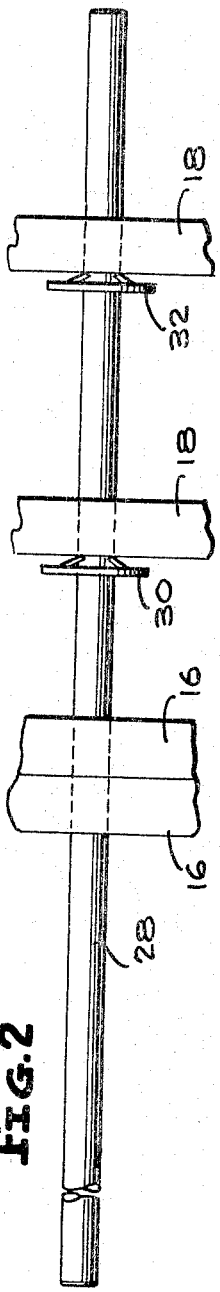
FIG. 2 illustrates in full lines the bolt rod extended through three units with the nuts thereon ready to be drawn back into final position.

The completed or finished bolt is formed from a rod of the desired metal, preferably steel, and the rod may be cut in the desired length, initially to connect together two or more bodies such as the pair of beams 16, or the group of timber units, or a workman may start with a rod of indeterminate length and run it through apertures formed in alignment through the beams of the different units, placing the spring self-gripping nuts thereon as the rod progresses through the beams, and then cutting off the excess length of material after all of the units have been coupled together, leaving enough length projecting from the outside unit for the formation of the bolt head. As an illustration of one method of forming the threadless bolt and effecting the tying together of a number of units such as those shown, it will be seen that the beams of the three units 10, 12 and 14 have been provided with the aligned holes or apertures 22, 24 and 26 respectively. A tie rod 28 is then extended at one end through the aligned apertures in the beams 16 of the first unit 10. When the end of the rod enters the space between the unit 10 and the unit 12, a spring self-gripping nut may be slipped on the end of the rod. The rod is then extended further into and through the aperture 24 of the next unit beam and when the free end appears in the space between the beams of the units 12 and 14, a second spring self-gripping nut will be slipped thereon. The second nut is shown in full lines in FIG. 2 and designated 32. The nuts 30 and 32 will be carried forward until they contact the beams 18 of the two units 12 and 14, whereupon the movement of the rod can be continued until the free end of the rod appears beyond the innermost beam. The rod then may be drawn back until the nut 30, first applied, contacts the unit 10, whereupon further retraction of the rod will not be permitted, but by spacing the units 14 and 12 further apart than the units 10 and 12, the second nut 32 will not contact the unit 12 but may be drawn into place manually and the portion of the rod which remains projecting beyond the innermost unit 14 may then have the nut slipped thereon as indicated at 34. However, instead of moving the rod to an extent where it may be necessary to pull it back so as not to leave too much of the rod wasted beyond the innermost unit, the advancing end of the rod can be stopped immediately after a sufficient amount of it appears beyond the innermost unit 14 to receive a nut, such as the nut 34, after which the first and second applied nuts 30 and 32 can be manually slipped in the reverse direction until they contact the units 10 and 12 respectively so that the position of the bolt rod 28 and nuts will then be as illustrated in FIG. 3.

Figure 3:
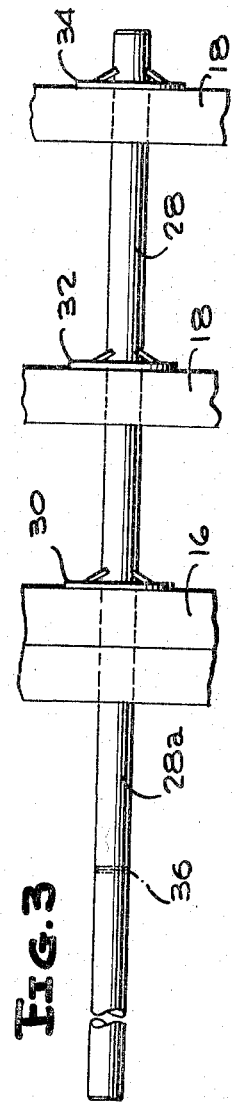
FIG. 3 illustrates the bolt rod and nuts in final position before severing the rod and forming the head.

After the condition of the bolt rod 28 and nuts is developed to the point illustrated in FIG. 3, and considering that an indefinite length of the bolt rod was started with, the rod is severed at a location adjacent to the outer side of the outermost unit 10, as, for example, at the marking or severance line designated 36, leaving the portion 28a with which to form or fashion the bolt head.

The portion 28a of the bolt rod is then bent back against the outer side of the unit 10 and in this operation the nuts will be drawn firmly against the units adjacent thereto, the bent portion forming the bolt head which is designated in the finished bolt 20, in FIG. 4, by the reference character 38, the reference character 40 here designating the bolt shank.

In the construction shown in FIG. 4, unit 10 is held firmly against the bent portion of the rod forming the bolt head and units 12 and 14 are supported on the bolt shank against inward movement and in spaced relation with each other and the said unit 10.

The construction of a spring self-gripping nut is of course, well known to those versed in the art, but an illustration of the same is given nevertheless in FIG. 5 where the body portion of the nut, which is in the form of a relatively thin disk of resilient metal, is designated 42 while the two end slotted resilient tongues are designated 44. When the nut is slipped onto a rod, in the manner here illustrated, the rod, which must be of a slightly greater diameter than the spacing between the notched ends of the tongues 44, will spring the tongues apart and consequently upon an attempt to reversely slide the nut on the rod the edges of the tongues will bite into the material and prevent such reverse movement.

While the invention has been illustrated and described in connection with a group of apertured beams, two of which are shown in side-by-side contacting relation to form one structural unit, while others have been shown singly in spaced relation, it is to be understood that the threadless tie bolt of the present invention formed in the manner described, may be used to tie together two or more or any number of beams in side contacting relation to form a massive beam unit. In such case it will be obvious that only a single spring self-gripping nut would be employed, being applied to the end of the bolt which projects through the group of beams while the opposite end of the bolt would be bent or turned into locking position to form the head.

On the other hand a series of bolts of predetermined length could be made up with an end portion of the rod sections preliminarily turned or bent to form the head 38 so that when the body portion of the bolt or the shank portion 40 is extended through an apertured body or a number of apertured bodies, the head would be ready formed to be forced against the outer side of the body while the spring self-gripping nut is slipped onto the opposite end of the bolt shank and into position against the inner side of the apertured body through which the bolt passes.

From the foregoing it will be seen that there is provided by the present invention a new and novel threadless tie bolt structure and method of making the same, and which tie bolt may be fashioned with the bent head formed, before putting the bolt into service and applying a nut, or such bolt may be fashioned from a length of rod material as a final step of coupling a number of apertured members together, by forming the bolt head at the desired stage of operation after any desired or necessary length of the bolt rod material has been utilized.

By the present invention much time and expense can be saved to builders and construction workers over the use of conventional threaded bolts having conventional preformed polygonal shaped heads, since a builder only needs to have a supply of plain metal rods and spring self-gripping nuts, by means of which he can form the bolts as needed in any desired length and bend the outer end of the rod material in clinching engagement with the beam or other unit through which the rod is passed, after cutting off the bolt forming portion of the rod from the remaining portion.

As this invention may be embodied in several forms without departing from the spirit or essential characteristics thereof, the present embodiment is therefore illustrative and not restrictive, since the scope of the invention as defined by the appended claims rather than by the description preceding them, and all changes that fall within the metes and bounds of the claims or that form their functional as well as conjointly cooperative equivalents, are therefore intended to be embraced by those claims.

I claim:

1. In a building structure the combination of a plurality of spaced substantially parallel beams having inner and outer sides and having aligned holes therein, and rods supporting said beams in spaced relation, each of said rods being straight and uniformly cylindrical and passing through said aligned holes; and spaced self-gripping nuts slideably positioned on each rod and contacting said beams on the inner side thereof, each of said nuts consisting of a disc having an aperture receiving the rod and having opposed resilient tongues projecting from one side and between which the rod is clasped and the nut is locked against movement along the rod in one direction, the other side of said disc being planar and contacting said beams on said inner side, and one end of the rod being bent to form an angularly extending head contacting the outer side of the outermost beam, whereby the beams are supported in spaced relation, and against inward movement along said rod.

2. In a building structure the combination of at least two beams in contact relation and means tying them together in assembled relation, and in spaced relation with at least one additional beam inwardly thereof, said means comprising a straight, uniformly cylindrical rod having a self-gripping nut slideably positioned thereon, said beams having inner and outer sides and having aligned openings therein, and said rod passing through said aligned openings, said nut consisting of a disc having an aperture receiving said rod and having opposed resilient tongues on one side thereof grasping the rod and preventing movement in one direction, and the other side of the nut contacting the inner side of the innermost beam of said beams in contact relation, and said rod having one end bent at right angles and contacting the outer side of the outermost of said beams in contact relation, and an extension on the other end of said rod, and said extension passing through said additional beam spaced from said beams in contact relation and carrying a second self-gripping nut which engages the inner side thereof with the tongues of said nut facing away from said inner side for supporting said additional beam in spaced relation, and against inward movement along said rod.

References Cited

UNITED STATES PATENTS

| | | | |
|---|---|---|---|
| 554,904 | 2/1896 | Benson | 287—20.92 |
| 2,229,708 | 1/1941 | Tinnerman | 85—36 |
| 2,275,738 | 3/1942 | Dark | 249—45 |
| 2,378,850 | 6/1945 | Hyre | 85—36 |
| 2,776,464 | 1/1957 | Stewart | 249—45 |

FOREIGN PATENTS 232,765  2/1961  Australia.

CARL W. TOMLIN, *Primary Examiner.*

R. S. BRITTS, *Assistant Examiner.*